ual Patent [19] 3,767,314
Wirch [45] Oct. 23, 1973

[54] APPARATUS FOR PRE-DRILLING HOLES IN STUDS AND BLOCKING

[76] Inventor: Charles E. Wirch, 1366 E. Palm, Altadena, Calif. 91001

[22] Filed: Nov. 18, 1971

[21] Appl. No.: 200,074

[52] U.S. Cl............................ 408/50, 408/1, 408/70, 408/3
[51] Int. Cl......................... B23b 39/18, B23b 39/24
[58] Field of Search............. 29/430, 200 A, 200 P, 29/155 R, 429, 431, 432; 408/42, 43, 44, 46, 50, 53, 70, 3, 1

[56] References Cited
UNITED STATES PATENTS

| 3,507,024 | 4/1970 | Powers | 29/430 |
| 3,543,374 | 12/1970 | McConnell | 29/430 |
| 3,606,658 | 9/1971 | McConnell | 29/430 |
| 3,613,204 | 10/1971 | McConnell | 29/430 |
| 1,958,552 | 5/1934 | Thomas | 408/46 |
| 2,910,896 | 3/1959 | Gasper | 408/3 |
| 3,068,721 | 12/1962 | Ausenda et al. | 408/3 |
| 3,143,901 | 8/1964 | Bawtinheimer | 408/3 |
| 3,491,809 | 1/1970 | Schneider | 408/42 |

Primary Examiner—Francis S. Husar
Attorney—Walter G. Maxwell

[57] ABSTRACT

Holes are pre-drilled in a stack of beams which are thereafter used as blocking or studs in the construction of building wall frames. The holes provide means for quickly routing electrical conduits through the wall frames. A machine for pre-drilling the holes includes a work support bed for holding several adjacent stacks of baled studs, and a movable drill carriage above the bed for mounting several laterally spaced apart power drills. A longitudinally movable conveyor frame pushes the studs lengthwise on the bed until a cam carried by the frame actuates a switch to automatically stop the studs under the drill carriage in a first drilling position. The drill carriage then automatically moves down to drill holes in the studs, and then automatically moves up to its initial position after drilling is completed. The conveyor frame then automatically moves the studs to the next drilling position, the drilling sequence is repeated, and the studs are then moved to further drilling positions until all holes are drilled. After drilling is completed, the conveyor frame continues to push the baled studs forward onto a suitable out-feed conveyor after which the studs may be cut into blocking. The conveyor frame then automatically returns to its original position ready to move another bale of studs.

11 Claims, 14 Drawing Figures

United States Patent [19]
Wirch
[11] 3,767,314
[45] Oct. 23, 1973
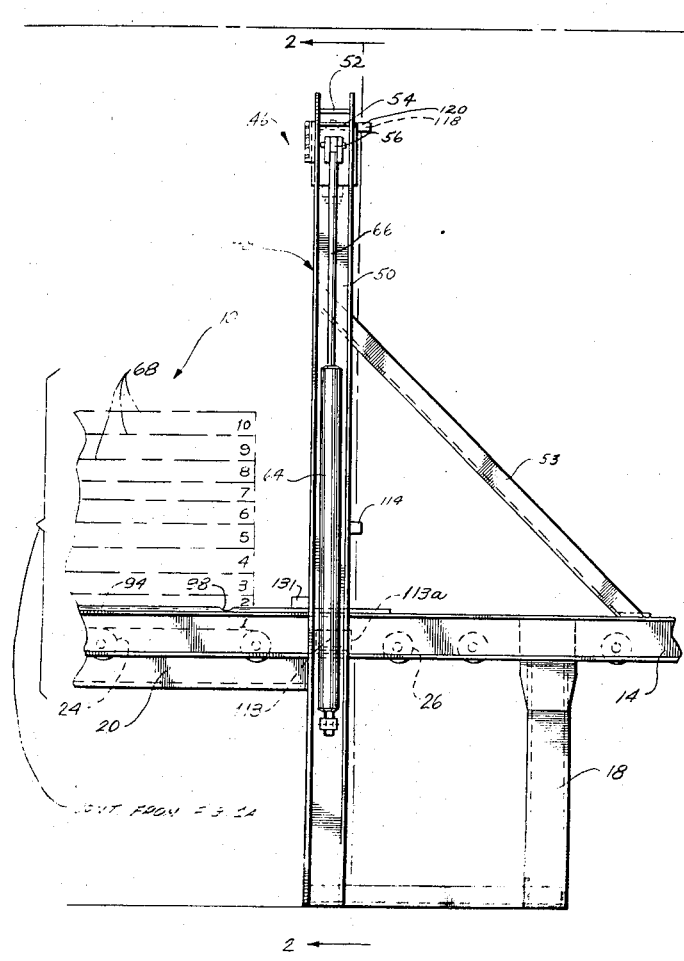

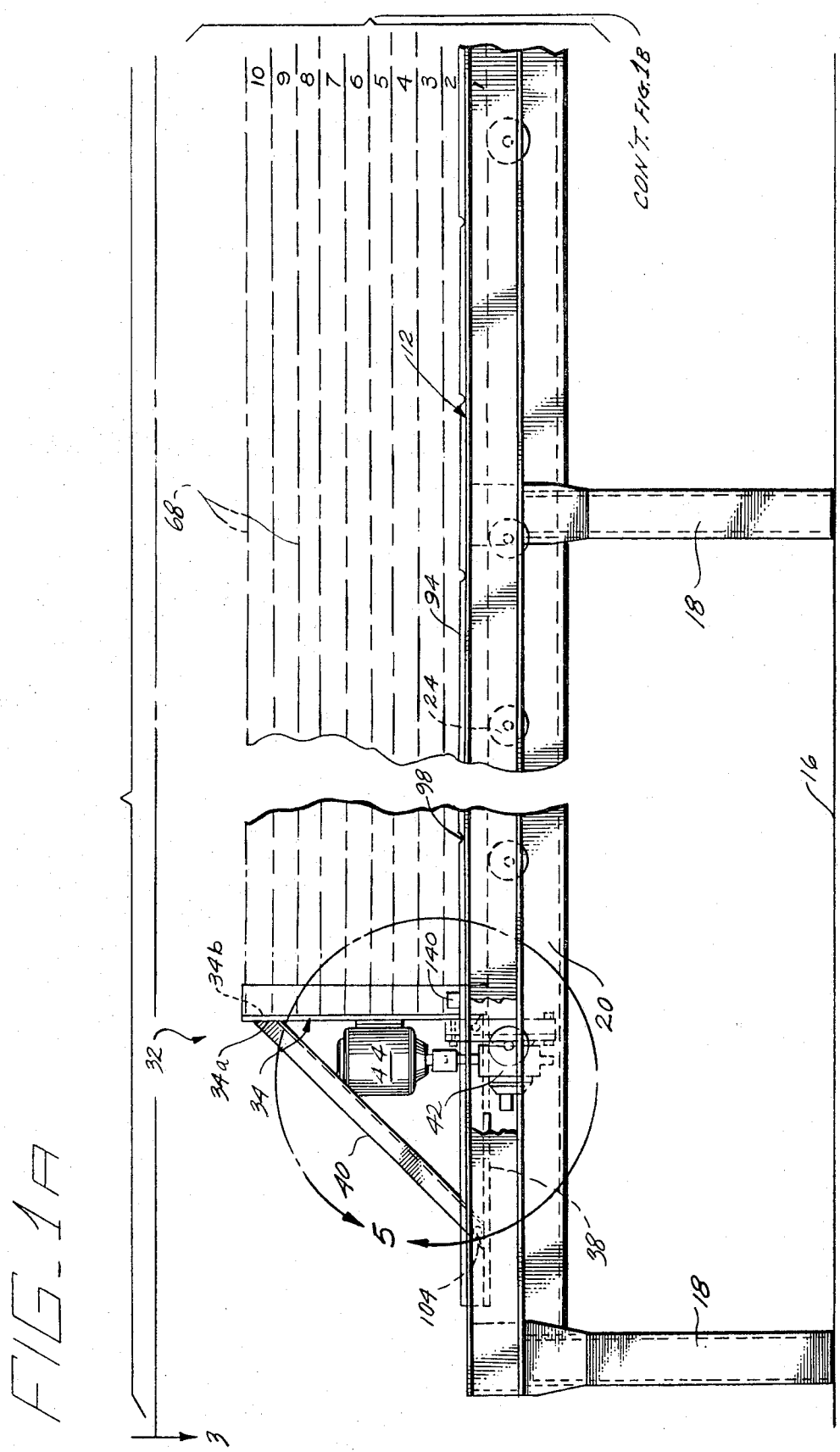

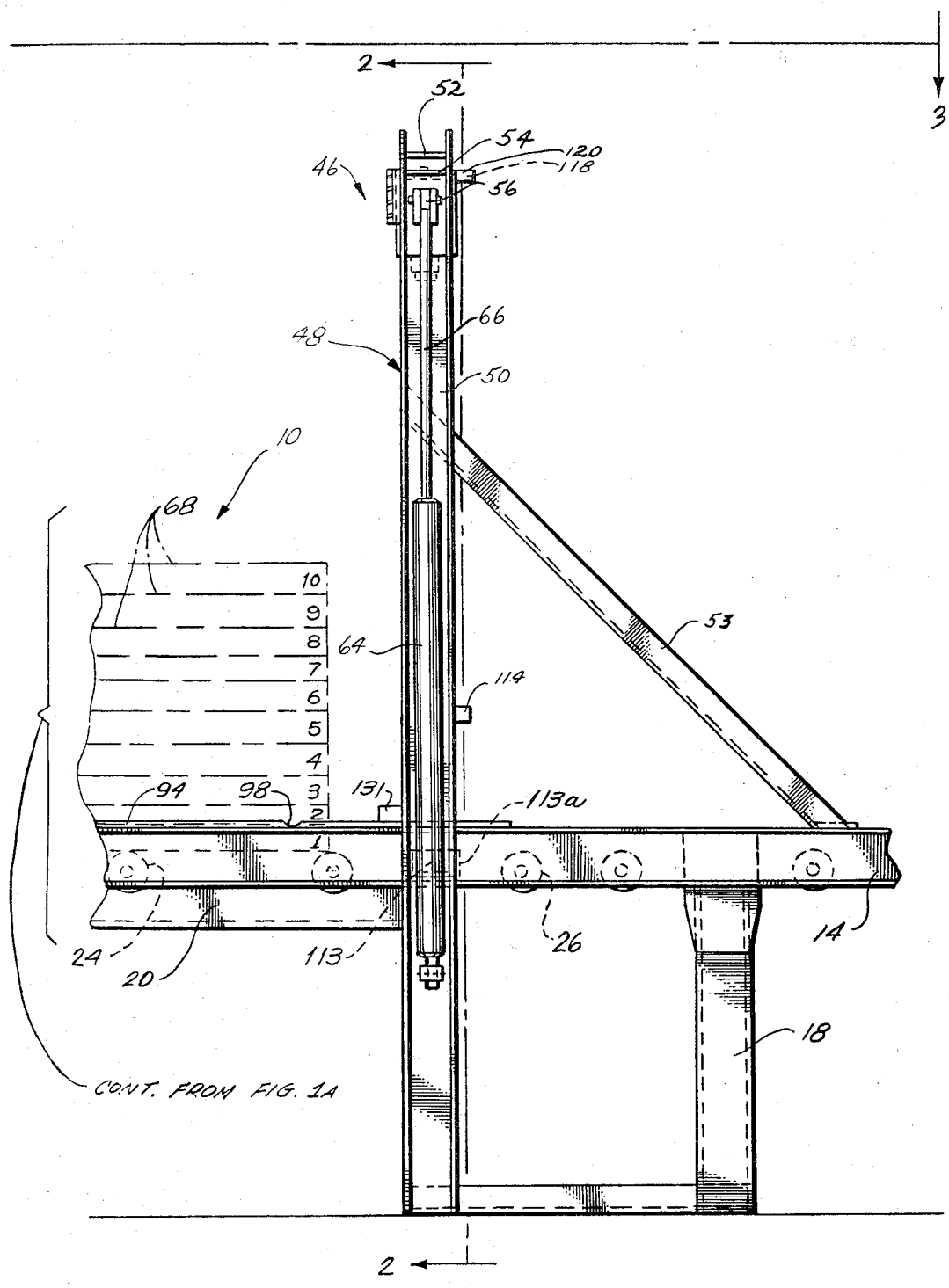

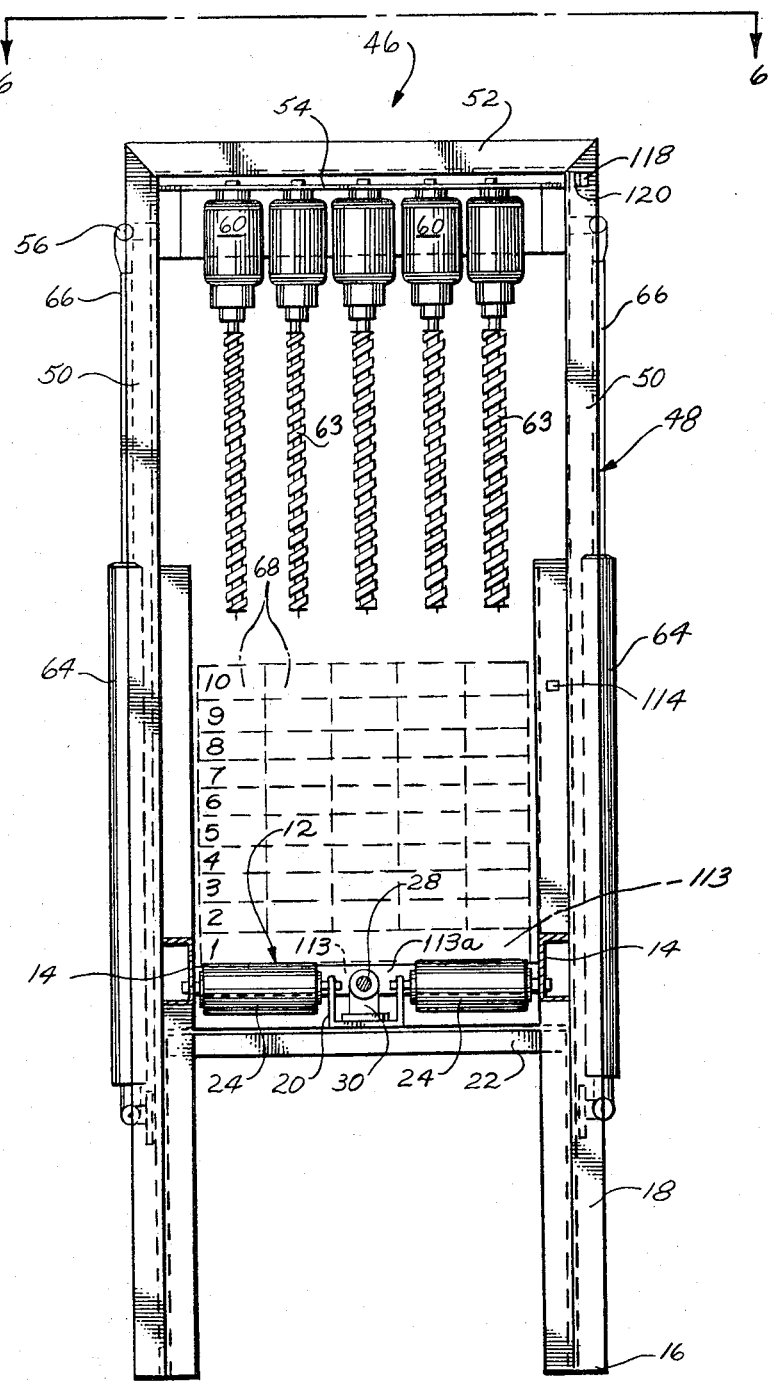
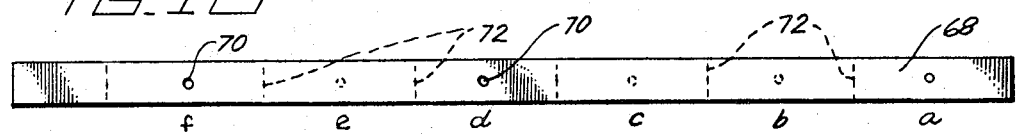

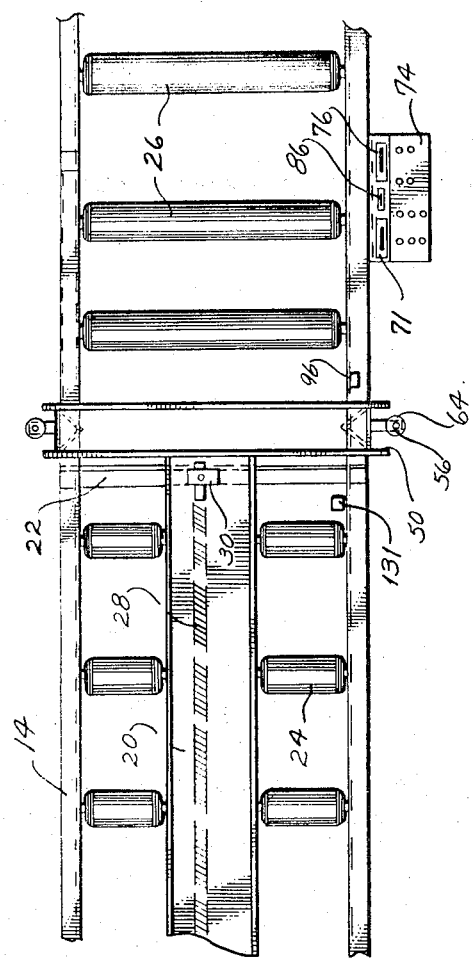
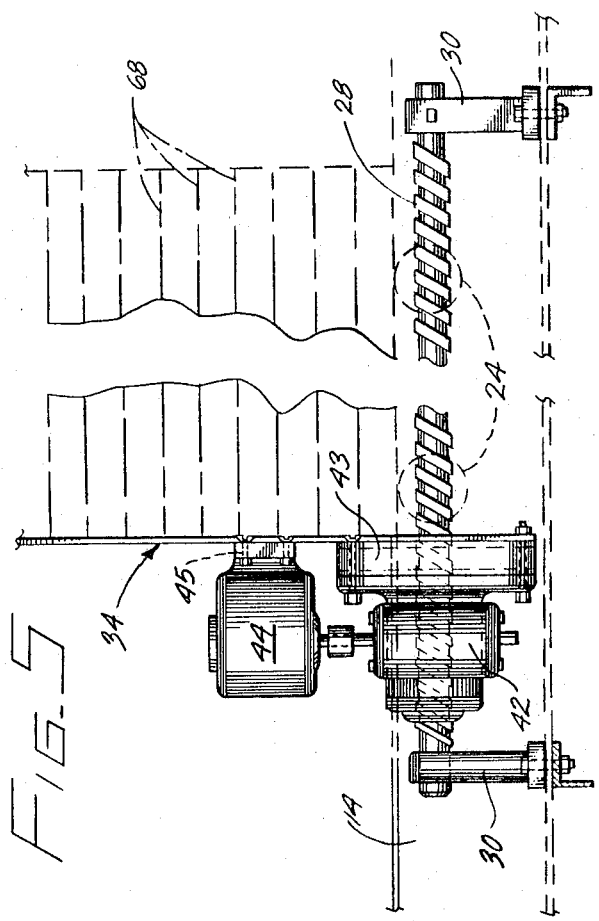
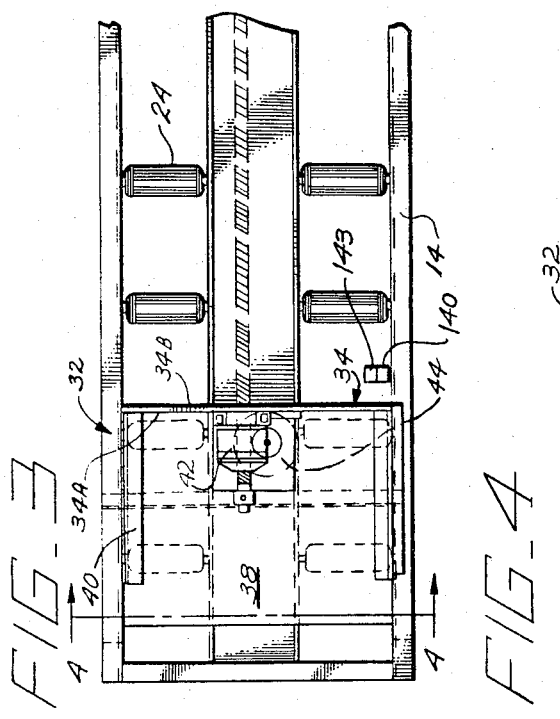
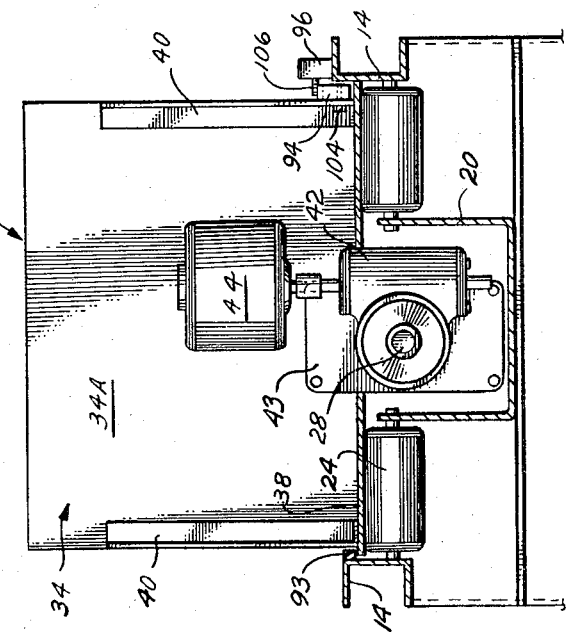

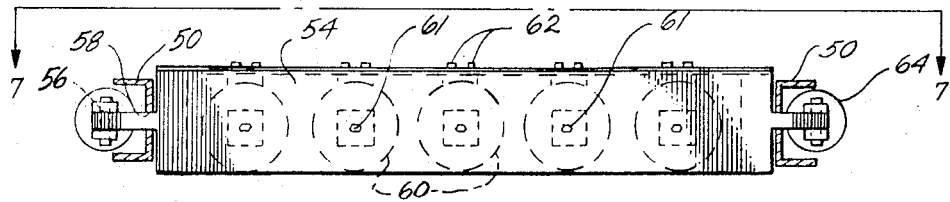
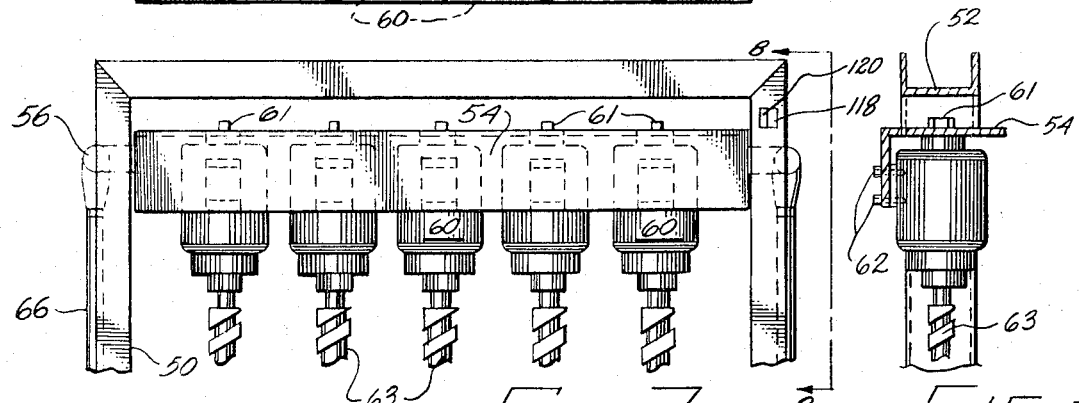
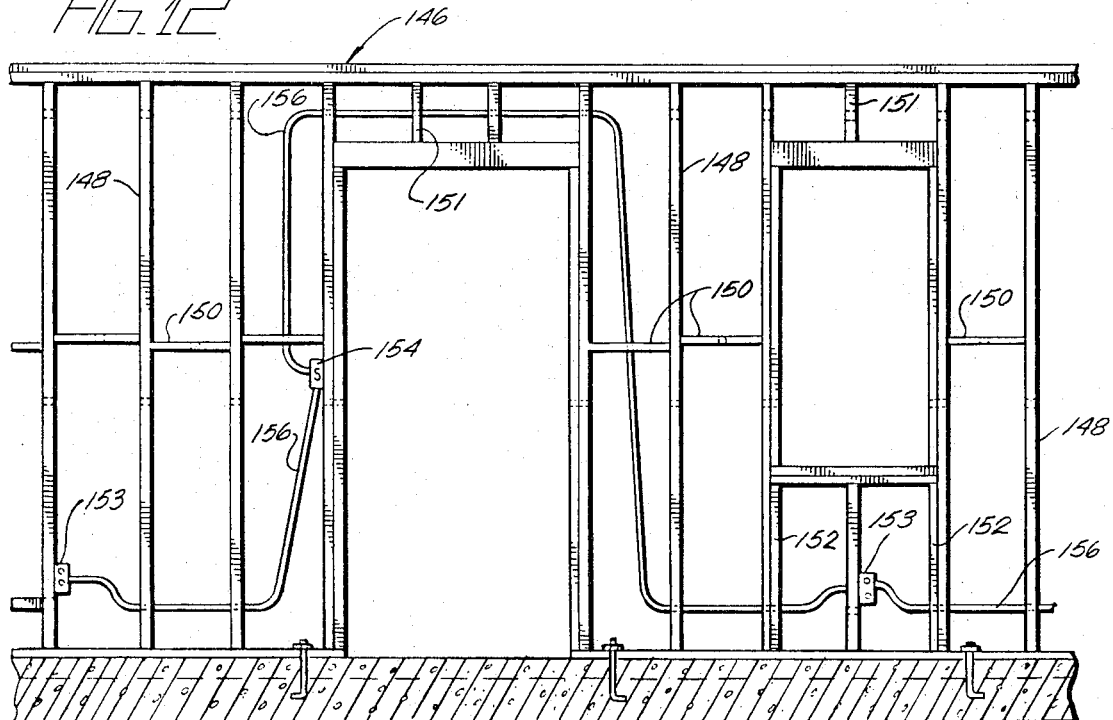
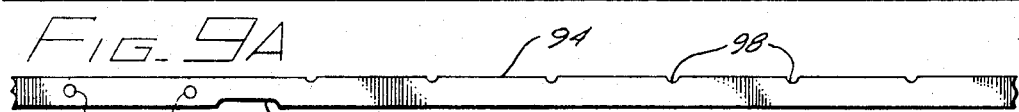
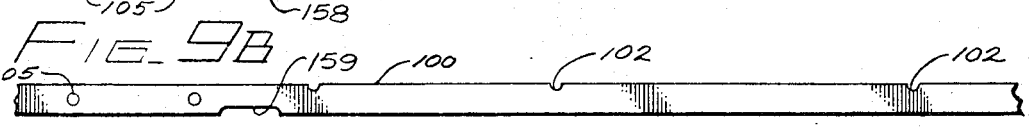

3,767,314

APPARATUS FOR PRE-DRILLING HOLES IN STUDS AND BLOCKING

BACKGROUND OF THE INVENTION

This invention relates to manufacturing prefabricated studs and blocking for use in constructing building wall frames and the like.

In the construction of framed wall structures for buildings and the like, spaced apart vertical studs are secured in place and braced laterally by horizontally extending blocks or "blocking." Usually one to two blocks are secured between each pair of adjacent studs. The blocking provides lateral rigidity for the studs and prevents the studs from twisting on their axes.

After the wall frame is constructed, an electrician wires the wall by drilling holes in certain of the studs and blocking and routes electrical conduits through the holes to connect outlet boxes and switches to the main power source.

It generally takes 20 percent to 30 percent of the electrician's time to drill the holes, which results in a substantial loss of time and money.

SUMMARY OF THE INVENTION

This invention contemplates pre-drilling holes in a stack of beams to be used as studs and blocking for the construction of building wall frames and the like. After the holes are pre-drilled in the beams, a building wall frame is constructed from the previously drilled beams. Thereafter, electrical conduits are routed through the holes to connect conventional electrical outlets and switches to the main power source. Thus, the electrician does not waste his valuable time constantly stopping work to drill holes in studs and blocking to provide a route for electrical conduits.

In a preferred form of the invention, the holes are drilled on a machine having a work support bed for holding a stack of beams. A movable drill carriage, which preferably carries a series of power drills continuously running during drilling operations, is disposed over the bed. The beams are moved under the drill carriage automatically by conveyor means, with the beams being stopped in a pre-determined position. The drill carriage is then moved toward the plane of the bed so the drills can drill holes in the beams. Thereafter, the drill carriage is automatically moved away from the plane of the bed to allow the bed conveyor to move the stack of beams to further drilling positions, the drilling sequence being repeated for each drilling position.

BRIEF DESCRIPTION OF THE DRAWINGS

These and other aspects of the invention will be more fully understood by referring to the following detailed description and the accompanying drawings, in which:

FIGS. 1A and 1B together are a fragmentary elevation view showing stud drilling machine;

FIG. 2 is an elevation view, partly in section, taken on line 2—2 of FIG. 1B;

FIG. 3 is a fragmentary plan elevation view taken on line 3—3 of FIGS. 1A and 1B;

FIG. 4 is an enlarged elevation view, partly in section, taken on line 4—4 of FIG. 3;

FIG. 5 is an enlarged fragmentary elevation view of the conveyor drive means shown within the circle 5 of FIG. 1A;

FIG. 6 is a plan elevation view taken on line 6—6 of FIG. 2;

FIG. 7 is an elevation view, partly in section, taken on line 7—7 of FIG. 6;

FIG. 8 is an elevation view, partly in section, taken on line 8—8 of FIG. 7;

FIG. 9A is one embodiment of a conveyor position control cam;

FIG. 9B is an alternate embodiment of a conveyor position control cam;

FIG. 10 is a plan elevation view showing a preferred method of pre-drilling a beam;

FIG. 12 is an elevation view showing the use of pre-drilled studs and blocking.

DETAILED DESCRIPTION OF THE PREFERRED EMBODIMENTS

Figure 11:
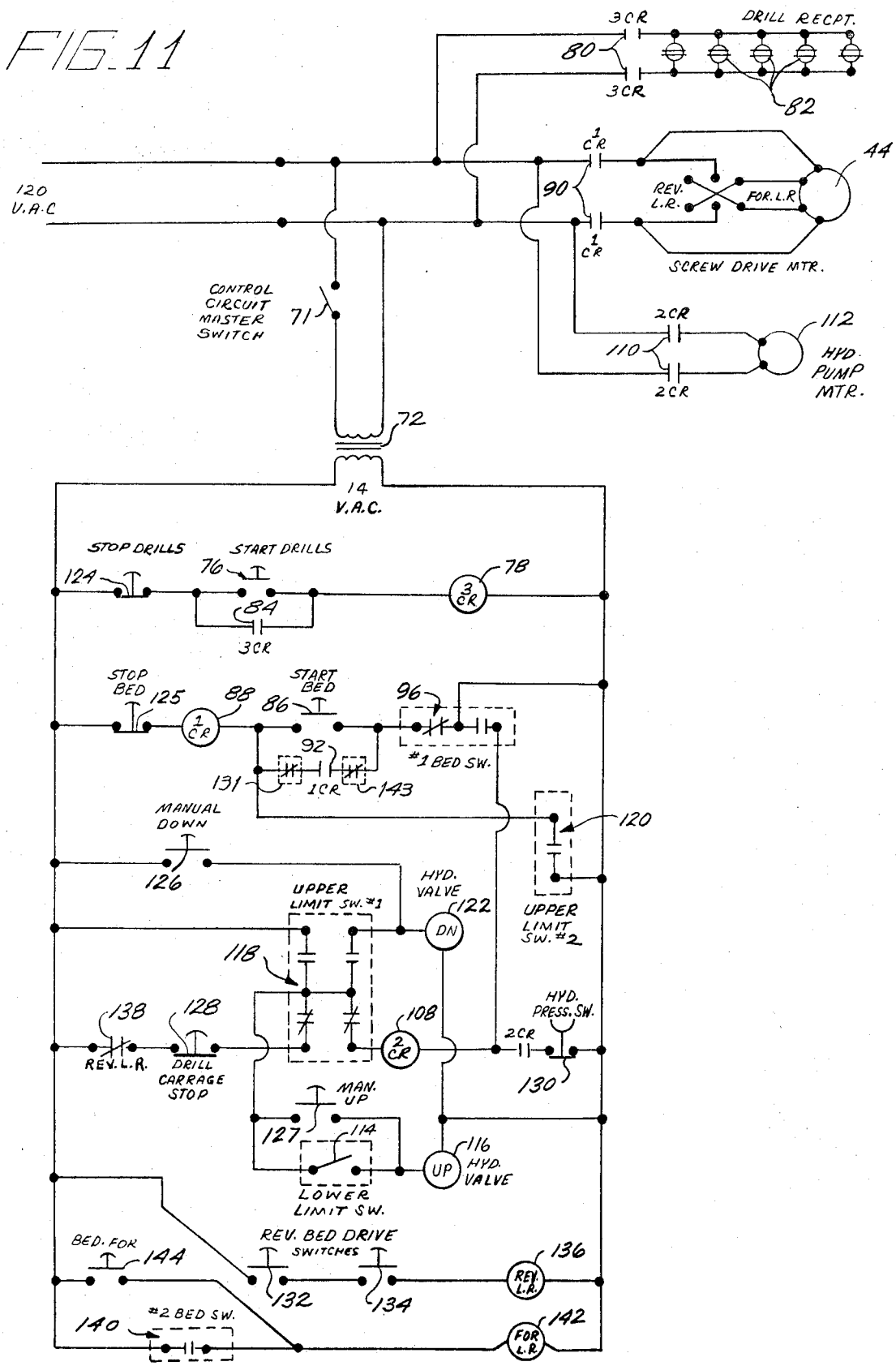
FIG. 11 is a schematic electrical diagram illustrating the operation of the stud drilling machine.

Referring to FIGS. 1A and 1B, a stud drilling machine 10 includes an elongated horizontally extending rigid work support bed 12, having a pair of horizontal, laterally spaced apart and parallel, outwardly opening U-shaped outer channel members 14, each being supported above a floor 16 by longitudinally spaced apart, upright supports 18.

An elongated, longitudinally extending, upwardly opening U-shaped roller support 20 located between channel members 14 runs parallel to the channel members and extends approximately one-half the length of the work support bed. The portion of the bed traversed by roller support 20 shall hereafter be called the front half of the work support bed, with the remaining portion of the work support bed being called the rear half of the bed. (Only a small portion of the rear half of the bed is shown in FIGS. 1A, 1B, and 3 for clarity). The roller support lies substantially along the center of the space between outer channel members 14 and is supported there by longitudinally spaced apart, laterally extending, horizontal cross pieces 22 (see FIG. 2) which are rigidly secured to supports 18.

As shown best in FIG. 3, two parallel series of longitudinally spaced apart front work support rollers 24 extend the length of the front half of the work support bed to form a conveying surface lying in a horizontal plane. The rollers in each row are secured at one end to a respective one of the channel members and the other end to a respective side of roller support 20. The rear half of the work support bed includes a single series of elongated transverse rollers 26 extending laterally between outer channel members 14, the rear rollers 26 being in the same horizontal plane as forward rollers 24.

An elongated rigid lead screw 28 extends the length of the front half of the bed and is positioned within U-shaped roller support 20 so as to extend parallel to the inner walls of the roller support. The lead screw is maintained in its rigid position by brackets 30 (see FIGS. 2 and 5) resting on the upper surface of the cross piece of roller support 20.

An upright, longitudinally reciprocating work conveyor frame 32 is mounted above the plane of work support bed 12. Conveyor frame 32 includes a vertically disposed, rectangular push plate 34 which extends laterally across the width of the work support bed. Push plate 34 has a reverse face 34a and a front face 34b adapted to push against work supported on the bed to the rear of the push plate. Conveyor frame 32 also includes a horizontal base plate 38 adapted to ride on the upper surface or rollers 24. The base plate is integral with the bottom edge of push plate 34 and extends away therefrom toward the front of the bed at a right angle. A pair of diagonal braces 40 between the outer edges of the push plate and the base plate provide reinforcement for push plate 34.

Conveyor frame 32 is movable along the length of the work support bed by a linear actuator, preferably a machine screw jactuator 42, which houses a rotatable element (not shown) operatively coupled to lead screw 28 by ball bearings in a helical ball race. Jactuator 42 is fixed to a mounting bracket 43 rigidly secured to rear face 34a of push plate 34. The rotatable element of the jactuator is driven by a motor 44 rigidly secured to reverse face 34a of push plate 34 by bolts 45 (see FIG. 5). Operation of the motor causes the conveyor frame to move in one direction or the other lengthwise on the bed, depending upon the particular direction of rotation of the jactuator.

A vertically reciprocating drill carriage 46 bridges approximately the mid-point of the work support bed. Drill carriage 46 includes a downwardly opening, generally U-shaped rigid framework 48 extending laterally over the work support bed. The rigid framework includes a pair of laterally spaced apart, upright, outwardly opening U-shaped posts 50 adjacent the outer edges of the bed, and a horizontally disposed, upwardly opening, U-shaped cross piece 52 extending between the upper ends of posts 50. The posts are braced by diagonally extending braces 53 between outer channel members 14 and posts 50. A horizontally disposed, inverted L-shaped, movable drill hanger 54 extends between posts 50, each end of the drill hanger having an outwardly projecting mounting bracket 56 extending through an elongated vertical slot 58 (see FIG. 6) formed centrally in the cross piece of the adjacent post 50. Thus, the drill hanger is able to move vertically in the space above the work support bed and between posts 50.

A plurality of laterally spaced apart electric drills 60 are rigidly secured to the horizontal cross piece of movable drill hanger 54 by bolts 61. The drill casings also are rigidly secured to the vertical leg of the drill hanger by bolts 62. Each drill drives a respective vertically disposed and downwardly extending drill bit 63.

The outer side of each post 50 mounts respective vertically extending, double-acting hydraulic actuator 64 having a vertically reciprocating piston arm 66 extending upwardly for connection to a respective one of the mounting brackets 56. Thus, hydraulic fluid supplied to the actuator alternately contracts and extends piston arm 66 to lower and raise the drills toward and away from the plane of the work support bed.

In use, the work support bed holds side-by-side stacks of beams 68 which are pushed under drill carriage 46 by conveyor frame 32. Preferably, five rows of beams, each row stacked ten beams deep, are mounted on the work support bed. Each stack of beams is aligned vertically with a respective one of the drill bits 63. The drills run continuously during use of the machine. The conveyor frame is adapted to alternately push the studs forward and stop them at predetermined positioned at which holes 70 (see FIG. 10) are bored by lowering the drill carriage so the drills can bore holes in their corresponding stacks of beams.

FIG. 10 shows the preferred scheme for drilling beams 68, in which three of the holes 70 are drilled at longitudinally spaced apart points labeled a, d, and f in beam 68. The beams drilled in this manner can be used as studs in the construction of conventional building wall frames. Conversly, if the beam is to be used for blocking, additional longitudinally spaced apart holes are drilled at locations labeled b, c, and e (shown in phantom line in FIG. 10). After the beams thus drilled are removed from the conveyor they are cut laterally along lines indicated at 72 in FIG. 10 to provide separate pre-drilled blocks.

The preferred sequence for drilling beams 68 is best understood by referring to FIG. 11. After a bale of beams is placed on the work support bed, with conveyor frame 32 positioned at the forward end of the bed (as shown in FIGS. 1 and 2) the operator of the machine then closes a control circuit master switch 71 which supplies power from a conventional 120 volt line to a transformer 72 for converting this voltage to 14 volts a.c. Master switch 71 is located on a central control panel 74 mounted adjacent to one side of the work support bed. The operator then pushes a switch 76 on the control panel to energize a coil 78 of a control relay 3CR to close a pair of normally open contacts 80 which supply electrical power to separate electrical drill receptacles 82 to which drills 60 are coupled. The energized coil 78 of relay 3CR also closes a normally open contact 84 which continues to supply power to the drills even after switch 76 returns to its open position shown in FIG. 11.

After the drills are operating, the operator pushes a switch 86 which energizes a coil 88 of a control relay 1CR to close a pair of normally open contacts 90 which supply power to motor 44 to move the conveyor frame 32 longitudinally relative to the bed and thereby push the stacks of beams under drill carriage 46. The energized coil 88 of control relay 1CR also closes a normally open contact 92 which continues to supply voltage to relay 1CR even after switch 86 returns to its open position shown in FIG. 11.

The conveyor frame pushes the beams toward drill carriage 46, the beams being guided along the work support bed by a rigid guide bar 93 (see FIG. 4) secured to the inner side of one outer channel member 14. When the beams reach a first drilling position (position a, FIG. 10), an elongated cam 94 (see FIGS. 1A, 1B, and 4) carried by the conveyor frame engages a double pole microswitch 96 on the work support frame. As shown best in FIG. 9A, cam 94 preferably is an elongated metal bar having longitudinally spaced apart indentations 98 in its upper edge. The indentations are spaced apart the same distance as the required spacing for the drilling of holes 70 when beams 68 are to be used for blocking. FIG. 9B shows an alternative cam 100 having longitudinally spaced apart indentations 102 which are spaced the same distance apart as the spacing corresponding to that when beams 68 are used as studs. Fasteners, such as bolts 104, extend through cooperating holes 105 in the cams to releasably secure either cam to an edge of diagonal frame 40 and to a longitudinally and rearwardly extending plate (not shown) integral with a lower portion of push plate 34. The cam rides with the conveyor frame adjacent to the stack of beams, and guides the side of the beams opposite guide bar 93.

Normally, a spring biased contact 106 (see FIG. 4) of microswitch 96 rides on the upper edge of the cam. Each time it is desired to stop the bed, one of the indentations of the cam permits spring biased contact 106 to drop down into indentation 102, which moves switch 96 to the position opposite of that shown in FIG. 8. This movement of switch 96 cuts off power to relay 1CR which opens contacts 90 and stops conveyor drive motor 44. Thus, the stack of beams is positioned below the drill carriage automatically in a predetermined drilling position ready for the drill carriage to be automatically lowered. The actuation of switch 96 by the cam also automatically opens contact 92 which prevents the drive motor 44 from moving the conveyor frame and the beams as the drill carriage is lowered.

The actuation of switch 96 by the cams supplies power to a coil 108 of a relay 2CR which closes a pair of normally open contacts 110 to start a motor 112 of the hydraulic actuators to withdraw fluid from the piston arm cylinder and permit the piston arms to retract and thereby lower the drill carriage. As the drill carriage is lowered, drill bits 63 bore holes in the respective stacks of beams which are aligned below them.

The stacks of beams preferably pass over a laterally extending, elongated wooden block 113 removably disposed in an upwardly opening U-shaped channel 113a positioned on the work support bed below the drill carriage. The channel is held in a rigid position, with its ends welded to the inner sides of outer channel members 14. In use, the drill bits pass into a portion of block 113, which prevents the holes in the bottom beam of each stack from splintering when drilled. The block may be removed from the channel and replaced as needed.

When the drill carriage reaches its downward limit, drill hanger 54, or other suitable movable part of the drill carriage, engages a normally open single pole limit switch 114 secured to an appropriate place on a stationary portion of the drill carriage (see FIGS. 1B and 2) to close switch 114 and thereby actuate a solenoid 116 which reverses the valves in the hydraulic actuators and automatically moves the drill carriage upward. When the drill carriage reaches its upper limit shown best in FIG. 2, the movable portion of the drill carriage engages a pair of microswitches, i.e., a double pole upper microswitch 118 and a single pole upper microswitch 120. Switches 118 and 120 are secured to a suitable position on the stationary portion of the carriage (see FIGS. 1B and 2). When switch 118 is contacted, it moves to a position opposite that shown in FIG. 11 to cut off power to hydraulic pump motor 112 and actuate a solenoid 122 to reverse the position of the hydraulic valves. The contact made with switch 120 automatically energizes relay 1CR to start motor 44 and move the conveyor frame and beams to the next drilling position, at which point an appropriate portion of cam 94, or cam 100, engages bed switch 96 to stop the bed and automatically lower the drill carriage. This sequence it repeated until all holes are drilled.

The electrical circuit arrangement for the pre-drilling machine also provides various manually operated switches to accomplish the foregoing tasks manually instead of automatically, for safety purposes and the like. These manually operated switches include a normally closed switch 124 for stopping the drills at any time, a normally closed switch 125 for stopping movement of the conveyor frame at any time, a normally open switch 126 for moving the drill carriage downward, a normally open switch 127 for moving the drill carriage upward, a normally closed switch 128 for stopping the drill carriage at any point and a normally closed switch 130 for stopping hydraulic pump motor 112 in cases of drilling obstruction, to prevent damage to the drills or drill motors, or the hydraulic system. These manually operated switches are located on central control panels 74.

When all the holes are drilled in the beams, the conveyor frame continues to move toward the rear half of the bed, to push the bale of studs toward the end of the work support bed where the studs are removed by suitable mechanical means (not shown). When the frame reaches the end of its travel, it contacts a microswitch 131 located on the bed to stop screw drive motor 44 automatically.

The operator then pushes a pair of switches 132, 134, located on control panel 74 which energizes a coil 136 of a reverse latching relay to open a normally closed contact 138 to prevent movement of the drill carriage and reverse rotation of motor 44, so as to reverse the movement of the conveyor frame and return it to its initial position ready to receive another bale of studs. When the conveyor frame reaches its initial position at the forward end of the work support bed, a switch 140 mounted on the front of the work support frame (see FIGS. 1A and 3) and held in contact with the bottom edge of cam 94 or cam 100 is then automatically actuated by moving into an elongated indentation 158 in cam 94 (or an identical indentation 159 in cam 100). When switch 140 is actuated, a forward latching relay 142 is energized to reverse the rotational direction of motor 44, which is then ready for driving the conveyor frame in the opposite direction during the next drilling sequence. Indentations 158 or 159 also contact a switch 143 located at the front of the work support frame to stop the frame automatically. A normally open switch 144 on control panel 74 may be manually operated at any time to energize forward latching relay 142.

The use of the studs and blocking produced by pre-drilling machine 10 is illustrated in FIG. 12 which shows a building wall frame 146 constructed from horizontally spaced apart vertically extending pre-drilled studs 148 which are laterally braced by horizontally extending pre-drilled blocking 150. The building wall frame also includes pre-drilled cripples 151 above a door and window frame, and long pre-drilled cripples 152 below the window frame. After the building wall frame is constructed from the pre-drilled studs and blocking, the electrician installs suitable electrical outlets 153 and switches 154 and connects them to a main power source (not shown) with conduits 156 routed through appropriate holes in the studs and blocking.

Thus, pre-drilling machine 10 provides means for rapidly drilling multiple holes in a large number of beams. Most houses today require more than 600 beams for the studs and blocking. The machine of this invention allows a single workman to pre-drill 600 beams in less than 2 hours. Moreover, the machine is capable of pre-drilling accurately-positioned holes for studs and blocking. The bales of beams which leave the machine also automatically align the beams in each stack, so it is an easy process to cut the beams to form the blocking and cripples. Since 20 percent to 30 percent of the electrician's time usually is spent drilling holes in studs and blocking, the machine and method of this invention provide a substantial savings in time and money.

I claim:

1. Apparatus for predrilling holes in several side-by-side stacks of beams in applications where the beams are baled together in a bundle having a predetermined height and width, the apparatus comprising an elongated work support for holding the several stacks of beams, the work support including a fixed rigid framework, and a series of longitudinally spaced apart rollers secured to the framework and forming a longitudinally extending work support bed lying in a substantially horizontal plane for supporting the beams, a drill support disposed over the work support bed, the drill support including a fixed support frame straddling the work support bed, a movable drill carriage above the work support bed and lying in a plane traversing the work support bed, the carriage being mounted on the support frame for guided vertical movement on the frame relative to the work support bed, and a series of laterally spaced apart, downwardly depending drills secured to the carriage in a position substantially normal to the plane of the work support bed, conveyor means mounted on the work support bed for moving the several stacks of beams under the drills, the conveyor means including an upright pusher frame disposed above the plane of the work support bed and extending upwardly a substantial portion of the height of the beams, and drive means for moving the pusher frame longitudinally relative to the fixed work support bed to push against an upright edge of the beams and move them under the drills, the fixed framework of the work support including longitudinally extending and substantially parallel guide means spaced laterally apart by a distance substantially equal to the width of the beams and extending along opposite sides of the rollers to provide guided longitudinal movement of the beams under the drill support, and means for controlling movement of the pusher frame drive means in synchronism with operation of the drills, the control means including means for intermittently stopping movement of the pusher frame drive means, so that the beams stop at several different longitudinally spaced apart positions relative to the plane of the drill carriage, power operated actuating means operative in timed relation to each stopping of the pusher frame drive means for automatically moving the drill carriage and drills toward the plane of the work support bed, power means for operating the drills as they move toward the work support bed to drill holes in the stacks of beams, and power operated reversing means operative in timed relation to movement of the drill carriage toward the plane of the work support bed for automatically moving the drill carriage away from the plane of the work support bed after the beams have been drilled.

2. Apparatus according to claim 1 in which the control means also includes means operative in timed relation to the carriage reversing means for stopping the drill carriage reversing means after the drills are out of engagement with the stacks of beams, means operative in timed relation to stopping of the drill carriage reversing means for automatically starting movement of the pusher frame drive means to push the beams to the next drilling position, means for sensing completion of the drilling operation, and drive means operated by the sensing means for reversing movement of the pusher frame to retract it to its starting position on the work support bed after the stacks of beams have been completely pushed under the drill support.

3. Apparatus according to claim 1 in which the drills are spaced substantially equidistantly apart along the carriage.

4. Apparatus according to claim 3 in which the drill support frame includes a pair of upright fixed legs on opposite sides of the work support bed, the drill carriage extending between the upright legs and being engaged with guide means in the legs for guided vertical movement of the drill carriage, and in which the drills are rigidly fixed to the drill carriage.

5. Apparatus according to claim 1 in which the work support bed includes two laterally spaced apart and parallel series of longitudinally spaced apart rollers extending the length of the work support bed, and in which the conveyor means includes an elongated guide disposed below the rollers and extending the length of the bed between the two series of rollers, and drive means carried on the pusher frame and engaged with the guide for moving the pusher frame relative to the work support bed.

6. Apparatus according to claim 5 in which the guide comprises an elongated lead screw, and the drive means comprises a drive motor coupled with a machine screw jactuator which, in turn, is engaged with the lead screw for traversing the lead screw lengthwise during operation of the drive motor to move the pusher frame along the work support bed.

7. Apparatus according to claim 6 in which the drills are spaced substantially equidistantly apart on the carriage.

8. Apparatus according to claim 7 in which the drill support frame includes a pair of upright fixed legs on opposite sides of the work support bed, the drill carriage extending between the upright legs and being engaged with guide means in the legs for guided vertical movement of the drill carriage, and in which the drills are rigidly fixed to the drill carriage.

9. Apparatus according to claim 1 in which the automatic stopping means comprises switch means for operating the drill carriage actuating means, and longitudinally spaced apart cam means carried on the pusher frame, the cam means being operative to engage the switch means to stop the pusher frame at predetermined positions relative to the plane of the drill carriage and drills.

10. Apparatus according to claim 9 in which the cam means is releasably secured to the pusher frame so it may be replaced by different cam means.

11. Apparatus according to claim 1 in which the drill support straddles approximately the mid-point of the work support bed such that the work support bed provides a first roller support on one side of the drill support for holding the several stacks of beams during drilling operations, and a second roller support on the other side of the drill support for receiving the several stacks of beams after they have been drilled, and in which the pusher frame is movable longitudinally back and forth along only the first roller support.

* * * * *